United States Patent
Jang (10) Patent No.: US 9,610,657 B2
(45) Date of Patent: Apr. 4, 2017

(54) HOT CLAMPING METHOD AND CLAMPING COOLING APPARATUS

(71) Applicant: Hyundai Motor Company, Seoul (KR)

(72) Inventor: Young Hoon Jang, Ulsan (KR)

(73) Assignee: Hyundai Motor Company, Seoul (KR)

( * ) Notice: Subject to any disclaimer, the term of this patent is extended or adjusted under 35 U.S.C. 154(b) by 343 days.

(21) Appl. No.: 14/144,322

(22) Filed: Dec. 30, 2013

(65) Prior Publication Data

US 2015/0114069 A1 Apr. 30, 2015

(30) Foreign Application Priority Data

Oct. 24, 2013 (KR) ........................ 10-2013-0127047

(51) Int. Cl.
| | | |
|---|---|---|
| B23P 9/00 | (2006.01) | |
| B21D 37/16 | (2006.01) | |
| B21D 35/00 | (2006.01) | |
| B23K 20/02 | (2006.01) | |
| B23K 20/227 | (2006.01) | |
| B21D 22/02 | (2006.01) | |
| B21D 37/06 | (2006.01) | |
| B21D 37/12 | (2006.01) | |
| B23K 101/18 | (2006.01) | |
| B23K 103/04 | (2006.01) | |

(52) U.S. Cl.
CPC .............. *B23P 9/00* (2013.01); *B21D 35/001* (2013.01); *B21D 37/16* (2013.01); *B23K 20/023* (2013.01); *B23K 20/227* (2013.01); *B21D 22/022* (2013.01); *B21D 37/06* (2013.01); *B21D 37/12* (2013.01); *B23K 2201/18* (2013.01); *B23K 2203/04* (2013.01)

(58) Field of Classification Search
CPC ........ B21D 37/10; B21D 37/12; B21D 37/04; B21D 37/06; B21D 37/16; B21D 22/02; B21D 22/022
USPC ......................................... 72/342.3
See application file for complete search history.

(56) References Cited

U.S. PATENT DOCUMENTS

| | | | | |
|---|---|---|---|---|
| 3,989,795 A | * | 11/1976 | McGee | ...................... B28B 3/08 264/332 |
| 6,273,049 B1 | * | 8/2001 | Okuda | ................... B21D 22/02 123/195 C |
| 6,742,374 B2 | | 6/2004 | Ozawa | |
| 8,257,516 B2 | | 9/2012 | Im et al. | |
| 2004/0020261 A1 | * | 2/2004 | Tokuda | .................. B21D 22/02 72/334 |
| 2008/0289393 A1 | * | 11/2008 | Lee | ...................... B21D 22/025 72/342.2 |

(Continued)

FOREIGN PATENT DOCUMENTS

| | | |
|---|---|---|
| JP | 06-182457 | 7/1994 |
| JP | 2006-212690 A | 8/2006 |

(Continued)

*Primary Examiner* — Jimmy T Nguyen
*Assistant Examiner* — Gregory Swiatocha
(74) *Attorney, Agent, or Firm* — Mintz Levin Cohn Ferris Glovsky and Popeo, P.C.; Peter F. Corless (57) ABSTRACT

A hot clamping method includes: blanking to cut a material; cold-working to cool down the cut material to produce a product having a shape of a completed product; heating the cooled product in a heating furnace; and clamping cooling to set the heated product in a clamp to clamp it so that it is in contact with the clamp to be cooled down.

3 Claims, 10 Drawing Sheets

(56) References Cited

U.S. PATENT DOCUMENTS

| | | | |
|---|---|---|---|
| 2010/0126640 A1* | 5/2010 | Fang | B21D 24/16 |
| | | | 148/559 |
| 2011/0219841 A1* | 9/2011 | Domange | B21D 37/16 |
| | | | 72/342.3 |
| 2013/0125607 A1 | 5/2013 | Samek et al. | |
| 2013/0205863 A1* | 8/2013 | Loesch | B21D 22/06 |
| | | | 72/342.7 |

FOREIGN PATENT DOCUMENTS

| KR | 10-0182407 B1 | 12/1998 |
|---|---|---|
| KR | 10-0902857 B1 | 6/2009 |
| KR | 10-0993988 B1 | 11/2010 |
| KR | 10-2012-0000454 A | 1/2012 |
| KR | 10-1130861 B1 | 3/2012 |

* cited by examiner

HOT CLAMPING METHOD AND CLAMPING COOLING APPARATUS

CROSS-REFERENCE TO RELAXED APPLICATION

This application is based on and claims under 35 U.S.C. §119(a) priority from Korean Patent Application No. 10-2013-0127047, filed on Oct. 24, 2013 in the Korean Intellectual Property Office, the disclosure of which is incorporated herein in its entirety by reference.

BACKGROUND (a) Field of the Invention

The present invention relates to a hot clamping method and a clamping cooling apparatus, and more particularly, to a hot clamping method and a clamping cooling apparatus which has a faster processing speed and reduced installation costs while having better performance than existing hot stumping methods.

(b) Description of the Related Art

Hot stamping is a process that enhances the strength of a raw material by two, three or more times through the quenching effect in a such manner that the cut material (e.g., a steel plate) is heated at a high temperature and formed in a mold and then is cooled down in the mold so that the temperature of the raw material is rapidly lowered.

Figure 1:
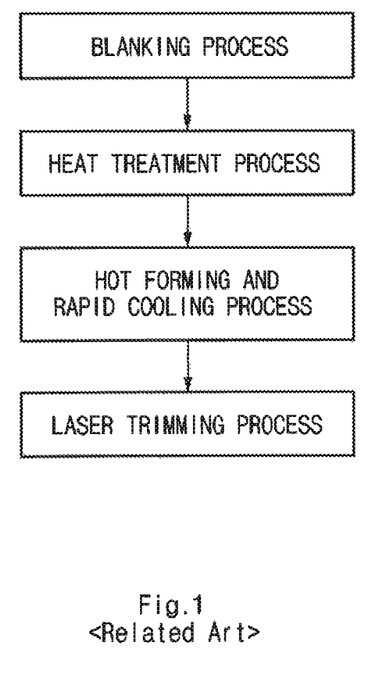
FIG. 1 (RELATED ART) is a flowchart illustrating a hot stamping method according to the related art.
Figure 2:
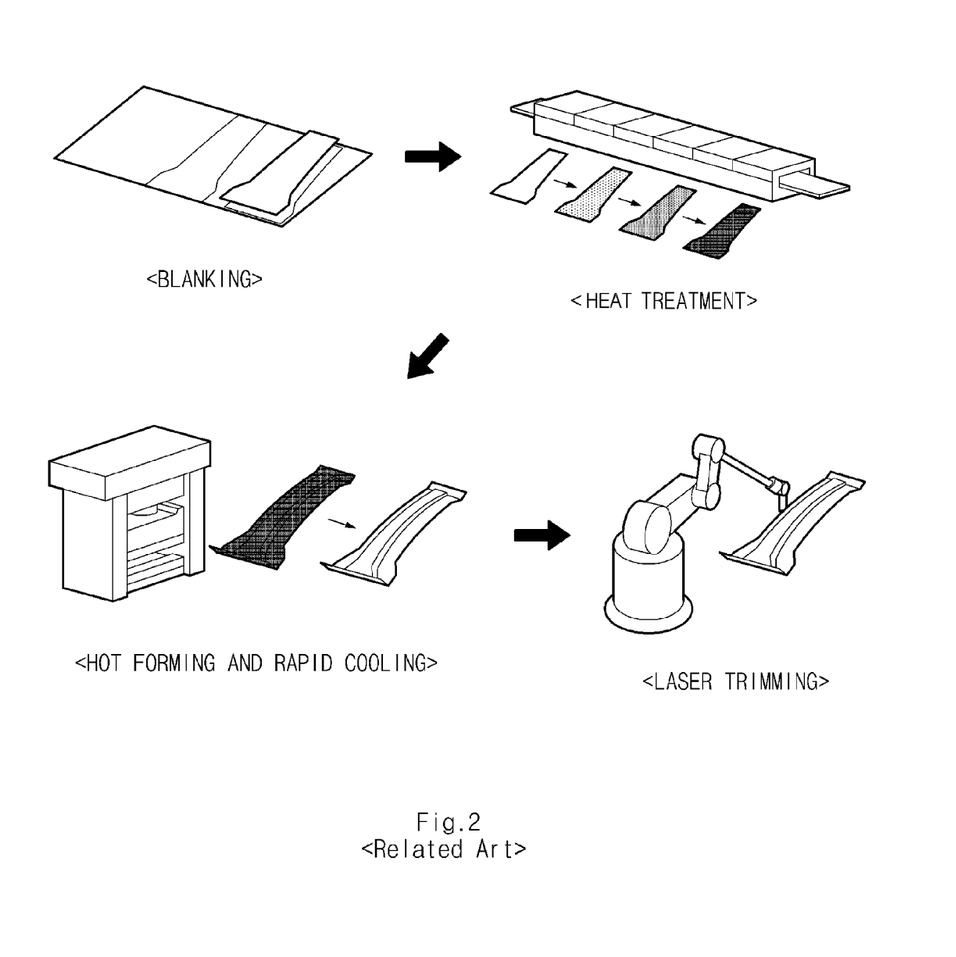
FIG. 2 (RELATED ART) is a series of views illustrating the process of a hot stamping method according to the related art.

FIG. 1 is a flowchart illustrating a hot stamping method according to the related art, and FIG. 2 is a series of views illustrating the process of a hot stamping method according to the related art.

Referring to FIGS. 1-2, according to the existing hot stamping method, a blanking process to cut a material is performed, the material is put into a heating furnace to be heated at a temperature from 750 degrees to 1000 degrees, and then the heated material is hot-formed into a resulting shape and cooled down in the mold with coolant. By doing so, hardness is increased and material deformation is prevented. In the final process, laser trimming is performed to remove unnecessary portions other than the product.

Undesirably, the existing method has shortcomings in that it takes a long time during the hot-forming and rapid cooling process such that productivity is low, the laser trimming also requires a long time and high costs, and it is difficult to maintain a temperature during the hot-forming process which results in variations in the quality of panels depending on the hot-forming.

SUMMARY

One object to be achieved by the present invention is to provide a hot clamping method and a clamping cooling apparatus capable of enhancing strength by two, three or more times and operating faster at lower cost by way of eliminating the hot-forming process, the cooling process and the laser trimming process.

In one aspect of the present invention, there is provided a hot clamping method, including: blanking to cut a material; cold-working the cut material so as to cool down the cut material to produce a product having a shape of a completed product; heating the cooled product in a heating furnace; and clamping cooling to set the heated product in a clamp to clamp it so that it is in contact with the clamp to be cooled down.

The cold-working may include: drawing the material; trimming or piercing the drawn material; re-striking the trimmed or pierced material; and trimming or piercing the re-struck material.

While the cold-working, the product may be reduced taking into account a resulting shape of the product.

In the clamping cooling, a surface of a clamp in contact with the product may conform to a resulting shape.

A clamp in the clamping cooling may have a tooling pin attached thereto, the tooling pin being inserted into holes formed on the product.

A plurality of the tooling pins may be attached and a same number of holes corresponding to the tooling pins may be formed on the product clamped by the clamp, wherein at least one of the plurality of holes formed on the product may have a shape conforming to the tooling pins and at least another may have an oval shape.

In another aspect of the present invention, there is provided a clamping cooling apparatus, including: a base; a cooling steel that is fixed on the base and has a heated product mounted thereon; cooling steels that move relative to the base so as to make contact with a top of the product mounted on the cooling steel; and a moving device that moves the cooling steels.

The clamping cooling apparatus may further include: a cooling steel that is installed on the base and makes contact with the product mounted on the cooling steel approaching along the side surface; and a slider that has the cooling steel at the end, is supported and slid by a slider support part fixed on the base, and is slid by a hydraulic cylinder.

The moving device may include: a rotation support part formed on the base; and a rotation part that is coupled by a support hinge of the rotation support part, wherein the cooling steel is fixed on a side closer to a front end with respect to the support hinge, and a hydraulic cylinder is coupled by a hinge on the other side with respect to the support hinge, wherein the rotation part rotates on the support hinge as the hydraulic cylinder operates.

The moving device may include: a plurality of guide pillars installed on the base; a fixed plate installed above the plurality of guide pillars; and a moving plate that is elevated by a hydraulic cylinder along the guide pillars and has the cooling steel fixed on a lower surface.

The cooling steel may have tooling pins attached thereto that are inserted into holes formed on a product.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, exemplary embodiments of the present invention will be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 3:
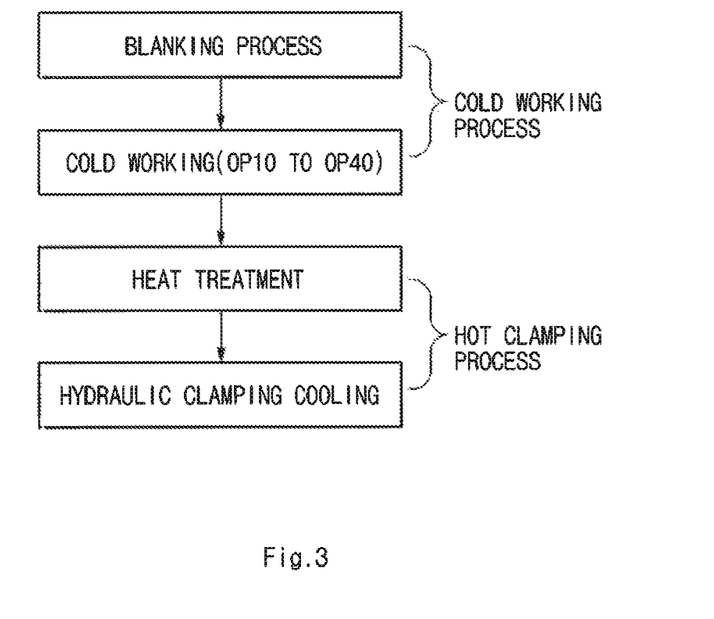
FIG. 3 is a flowchart illustrating a hot clamping method according to an exemplary embodiment of the present invention.
Figure 4:
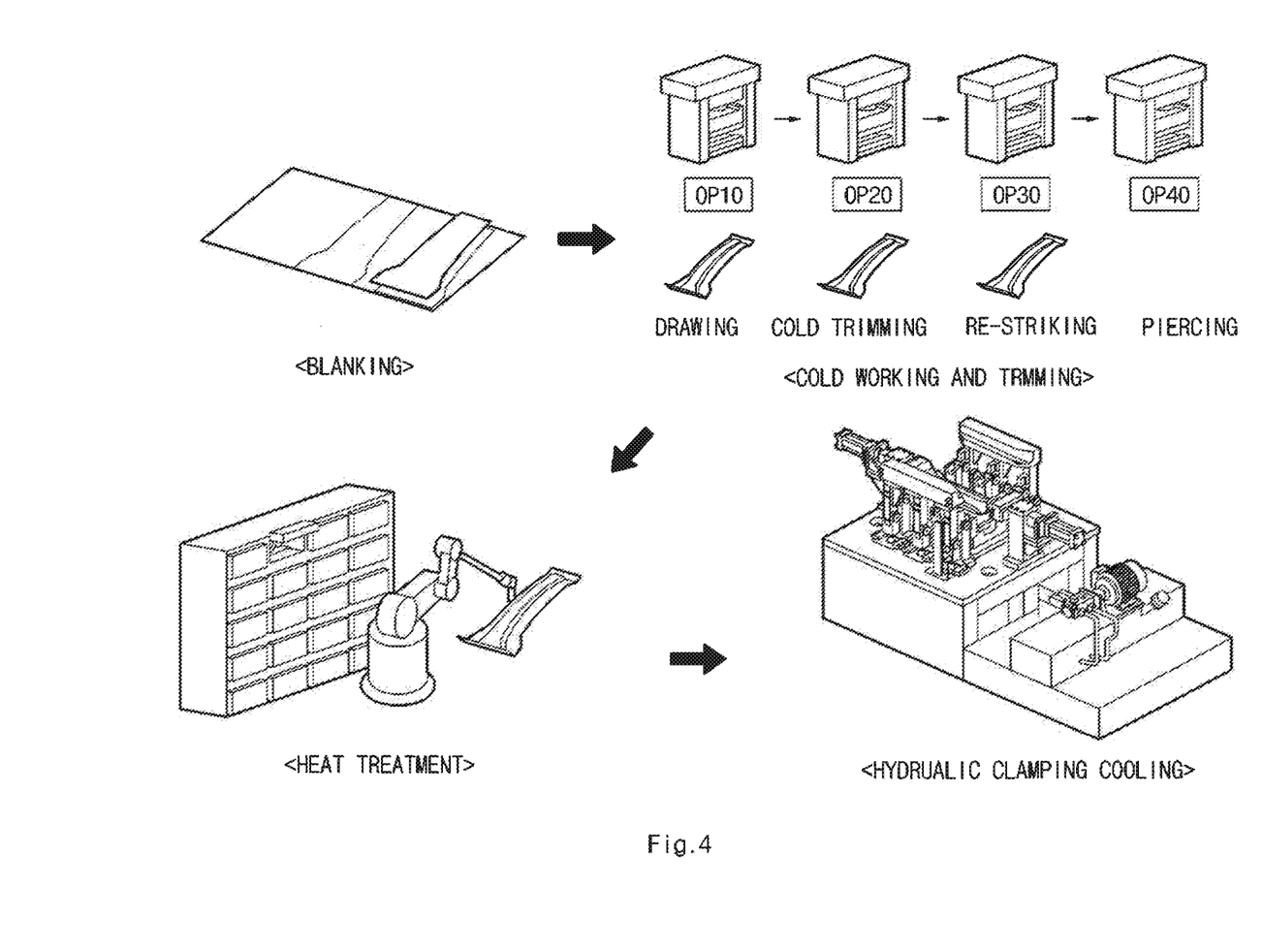
FIG. 4 is a series of views illustrating the process of a hot clamping method according to an exemplary embodiment of the present invention.

FIG. 3 is a flowchart illustrating a hot clamping method according to an exemplary embodiment of the present invention, and FIG. 4 is a series of views illustrating the process of a hot clamping method according to an exemplary embodiment of the present invention.

The hot clamping method according to an exemplary embodiment of the present invention is performed by a blanking process to cut a material, followed by cold-working to cool down the cut material to produce a complete product, followed by heat treatment process to heat the product in a heating furnace at a temperature from about 750° C. to 1000° C., and followed by a clamping cooling process to set the heated product in a clamp to clamp it so that it is in contact with the clamp to be cooled down.

The cold-working step/process may include: an operation to draw the material (OP10); an operation to trim or pierce the drawn material (OP20); an operation to re-strike the trimmed or pierced material (OP30); and an operation to trim or pierce the re-stroke material (OP40).

Taking into account that a product may expand during a later heating process, a cold-formed product is manufactured with a smaller size than a resulting product by 0% to 5%, preferably, 0.1% to 3%, and more preferably, 0.3% to 0.6%.

Further, in the clamping cooling, a surface of a clamp in contact with the product may conform to a resulting shape.

According to the present invention, since a complete panel (product) is produced in the cold forming process, laser trimming may be eliminated in later processes, and thus additional hot forming is not necessary (accordingly, a hot stamping press and molding can be eliminated which are time-consuming and costly), so that a resulting product can be completed faster at lower cost, with only a clamping cooling process.

In the clamping cooling process, a hydraulic or mechanical clamping cooling apparatus may be used. When a hydraulic clamping cooling apparatus is used, the fluid pressure only needs to clamp (approximately 100 MPa to 500 MPa), so that the apparatus may be implemented with lower cost than the hot stamping.

As such, according to the present invention, every shape molding and piercing, trimming are carried out in the cold-working process, and the formed product is heated at high temperature to be cooled down in a hydraulic clamping cooling apparatus, so that the quality of the panel may be improved at lower cost and the strength will be enhanced by two, three or more times.

Further, by preparing a plurality of clamping cooling apparatus in accordance with cycle times of the cold forming, and accordingly establishing a heating furnace, mass production may be realized at lower cost.

A cooling clamp apparatus used in a hot clamping method according to an exemplary embodiment of the present invention will be described in detail.

Figure 5:
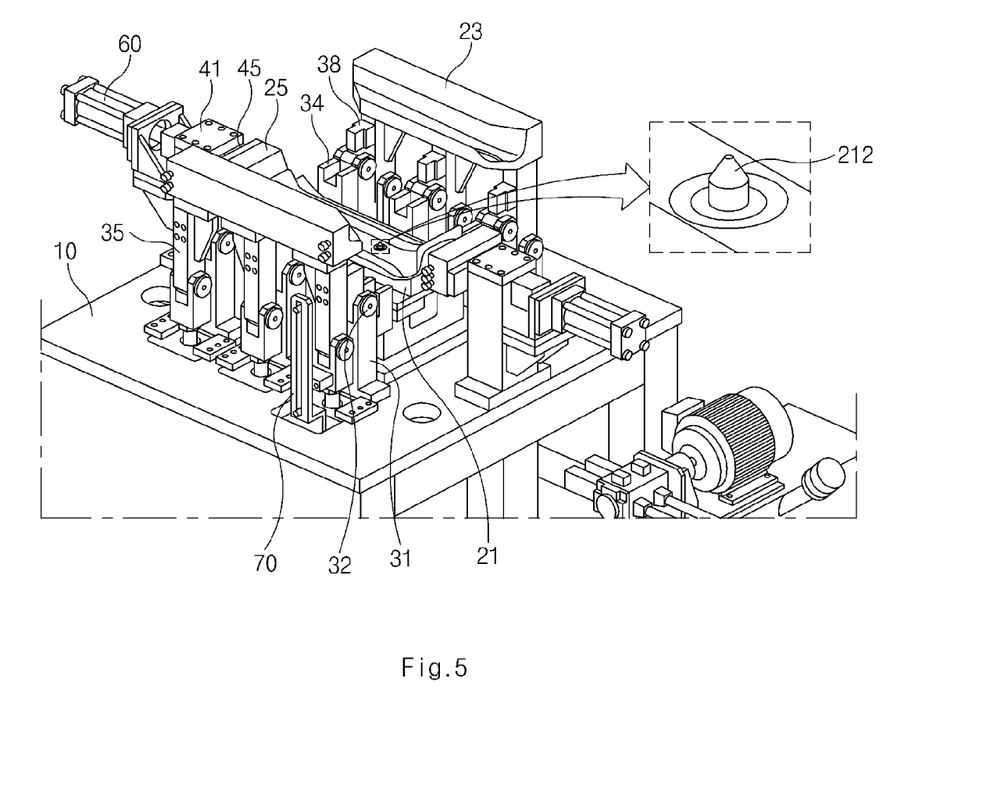
FIG. 5 is a perspective view of a hydraulic clamping cooling apparatus used in a hot clamping method according to an exemplary embodiment of the present invention.
Figure 6:
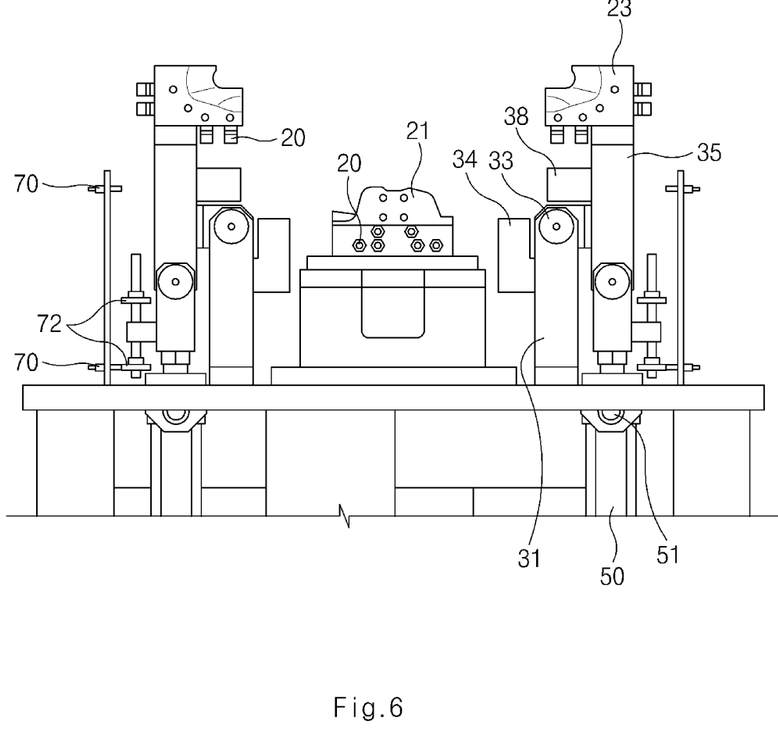
FIG. 6 is a side view of the hydraulic clamping cooling apparatus in FIG. 5 before a panel is mounted.
Figure 7:
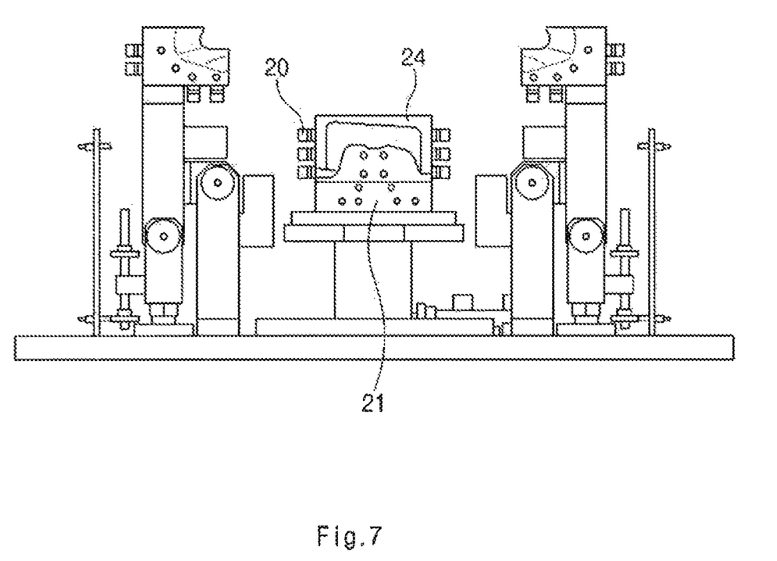
FIG. 7 is a view of the hydraulic clamping cooling apparatus in FIG. 6 after the panel is mounted.
Figure 8:
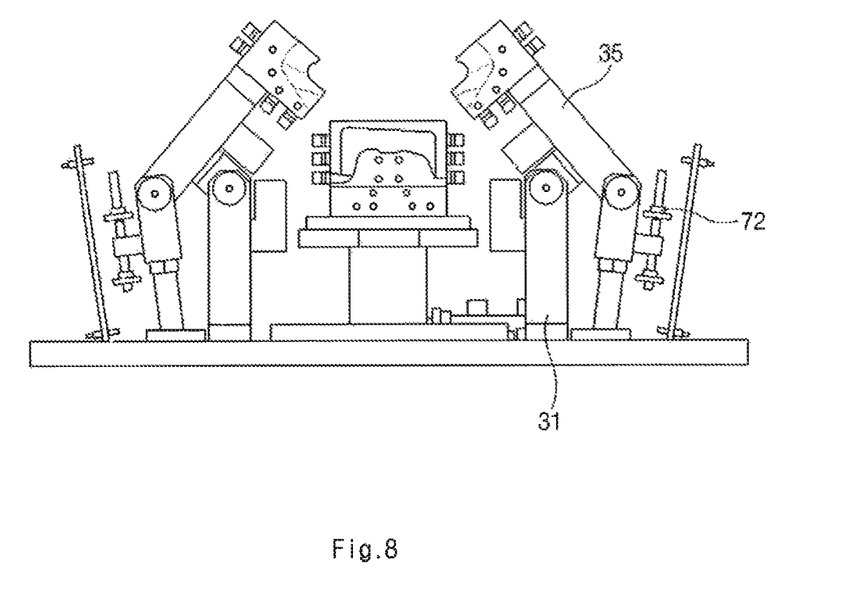
FIG. 8 is a view of the hydraulic clamping cooling apparatus in FIG. 7 in which a hydraulic cylinder is activated so that a rotating part is rotating.
Figure 9:
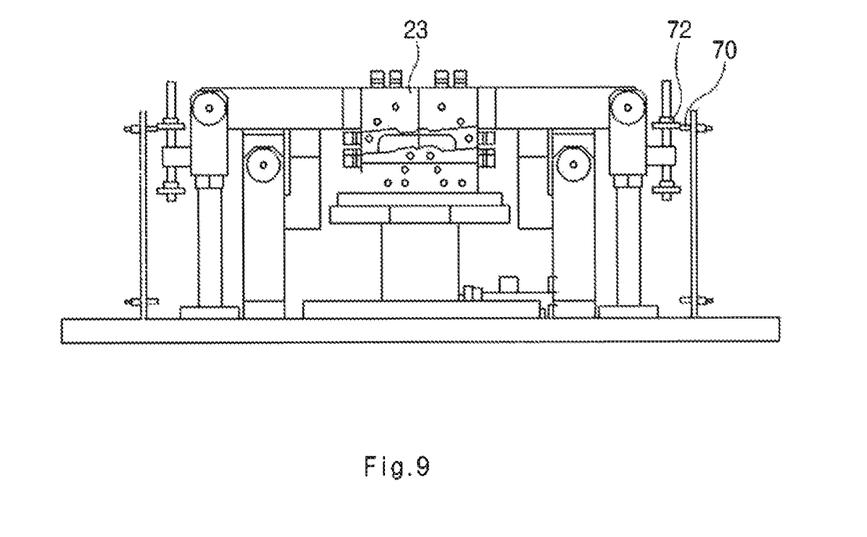
FIG. 9 is a view of the hydraulic clamping cooling apparatus in FIG. 8 in which a panel is clamped after one rotation of the rotating part.

FIG. 5 is a perspective view of a hydraulic clamping cooling apparatus used in a hot clamping method according to an exemplary embodiment of the present invention; FIG. 6 is a side view of the hydraulic clamping cooling apparatus in FIG. 5 before a panel is mounted; FIG. 7 is a view of the hydraulic clamping cooling apparatus in FIG. 6 after the panel is mounted; FIG. 8 is a view of the hydraulic clamping cooling apparatus in FIG. 7 in which a hydraulic cylinder is activated so that a rotating part is rotated, and FIG. 9 is a view of the hydraulic clamping cooling apparatus in FIG. 8 in which a panel is clamped after one rotation of the rotating part.

The cooling clamping apparatus used in the hot clamping method according to the exemplary embodiment of the present invention includes a base 10, a cooling steel 21 located on and secured to the center of the base, three pairs of rotation support parts 31 arranged on the base by both sides of the cooling steel 21, and rotation parts 35 each coupled with the end of the respective one of the rotation support parts 31 by a support hinge 32, 33.

To the rotation part 35, a cooling steel 23 is fixed on the side closer to the front end of the rotation part 35 with respect to the support hinge 32, 33, and a piston of a hydraulic cylinder 50 is coupled with the opposite side to the front end with respect to the support hinge 32, 33 of the rotation part 35.

In addition, the cylinder part of the hydraulic cylinder 50 is coupled with the base 10 on its top by a fixing hinge 51.

In the piston part of the hydraulic cylinder 50, a sensed part 72 moving with the piston is installed. In the cylinder part of the hydraulic cylinder 50, a sensor 70 parallel to the sensed part is fixed. The sensors are located at the upper limit and lower limit of strokes of the piston, and are designed to stop operation if they face or touch the sensed part moving with the piston, so that strokes of the piston may be controlled.

On the base, a slider support part 41 is installed on a side of the cooling steel 21 where the rotation support part 31 is not installed. The slider support part 41 has a slider 45 moving back and forth from the slider support part toward the cooling steel 21. A cooling steel 24 is fixed to the front end of the slider 45, and the hydraulic cylinder 60 is connected to the other end. Further, the rotation support part 31 includes a support stopper 34 and the rotation part 35 includes a rotation stopper 38, such that the rotation stopper 38 and the support stopper 34 are engaged at the location where the rotation part rotates on the rotation support part to be in contact with a product and securely support the rotation part. In particular, they are fastened by a rectangular groove so as to prevent rattling.

The cooling steels 21, 23, 24, and 25 make contact with and exchange heat from a heated product to cool down the product. Coolant circulates through the cooling holes 20 in the cooling steels so as to keep them at a low temperature. The contact areas are manufactured to have the same shape and dimensions with a completed product.

In particular, the hydraulic cylinders 50 and 60 are set to be from about 50 to 500 MPa suitable for freezing a shape and maintaining cooling at the time of clamping.

The operation of the clamping cooling apparatus will be described. Initially, a product is heated in a heating furnace at 900° C. or higher for three to six minutes, and, as shown in FIG. 7, the product is mounted on the cooling steel 21 before the rotation part 35 of the clamping cooling apparatus rotates as shown in FIG. 6.

Then, if the hydraulic cylinders 50 and 60 operate, the rotation part 35 rotates by the hydraulic cylinder 50 on the support hinge 32, 33 as shown in FIG. 8. As the piston of the hydraulic cylinder 50 is drawn, the hydraulic cylinder 50 also rotates in order to keep balance geometrically. In particular, as the piston is drawn, the sensed part 72 installed in the piston also moves upward, such that the hydraulic cylinder 50 operates until the sensed part 72 reaches the top of the sensor 70, as shown in FIG. 9. The sensor 70 stops the operation of the hydraulic cylinder 50 as soon as it senses the sensed part 72. Then, the rotation stopper 38 is engaged with the support stopper 34, such that the rotation part is more securely supported.

In addition, the slider 45 is guided by the hydraulic cylinder 60 with the support of the slider support part 41, such that it slides until the cooling steel 24 at the front end makes contact with the product.

If the cooling steels 21, 23 and 24 make contact with the product, it is cooled down for about 1 to 15 seconds.

After cooling is completed, the process is performed in the reverse order, and the product is pulled out.

Such a pivot or rotational cooling clamping apparatus is advantageous in that its top is widely opened so that it is easy to obtain a space to mount a panel. Further, by extending the distance from the support hinge 32, 33 to the front end of the rotation part 35, a stroke in the hydraulic cylinder may be expanded so that a clamping speed may become faster.

Now, a cooling clamp apparatus used in a hot clamping method according to another exemplary embodiment of the present invention will be described in detail.

Figure 10:
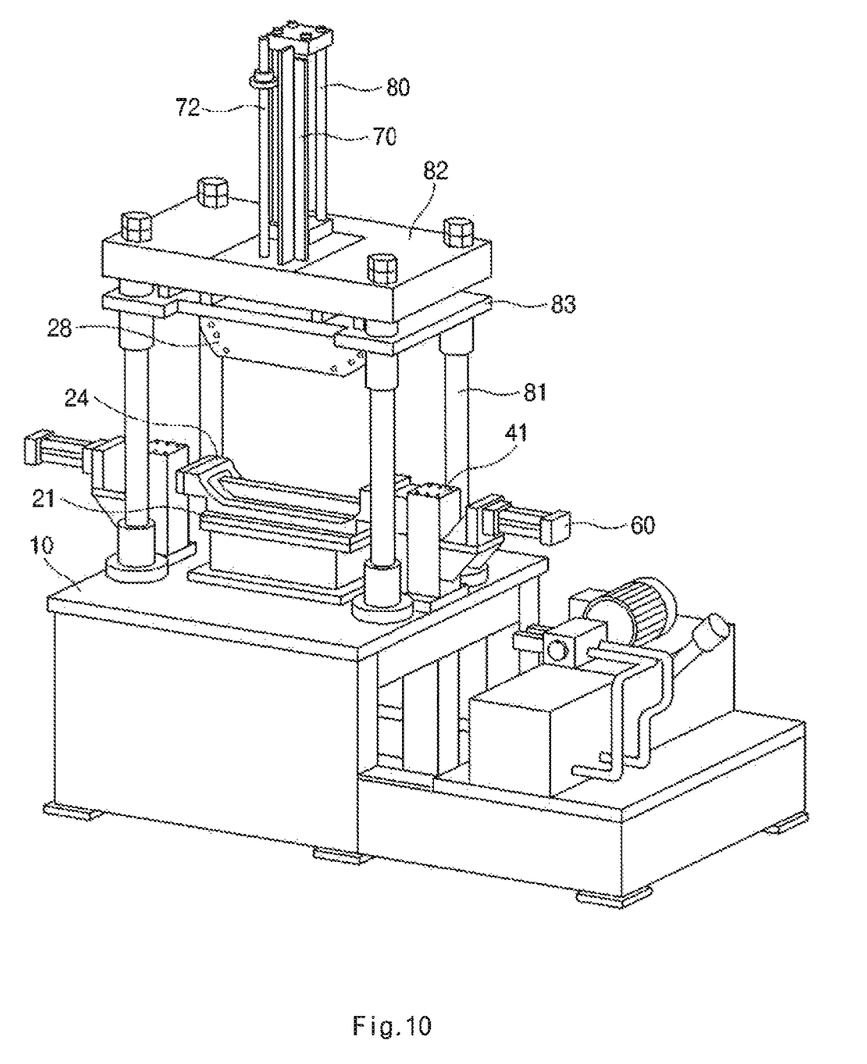
FIG. 10 is a perspective view of a hydraulic clamping cooling apparatus used in a hot clamping method according to another exemplary embodiment of the present invention.

FIG. 10 is a perspective view of a hydraulic clamping cooling apparatus used in a hot clamping method according to another exemplary embodiment of the present invention.

The cooling clamping apparatus includes a base 10, a cooling steel 21 that is located on and secured to the center of the base and has a heated product mounted thereon, and four guide pillars 81 installed at corners of the cooling steel 21 on the base.

Further, on the tops of the guide pillars, a fixed plate 82 is secured, and a hydraulic cylinder 80 is fixed thereon. Below the fixed plate, a moving plate 83 is installed that is elevated by the guide pillars and has a cooling steel 28 on its lower surface. The piston of the hydraulic cylinder is connected to the moving plate 83.

In addition, a slider support part 41 is installed on the base, and a slider 45 is installed on the slider support part 41 that moves back and forth toward the cooling steel 21. A cooling steel 24 is fixed to the front end of the slider 45, and the hydraulic cylinder 60 is connected to the other end.

The cooling steels 21, 24, 25, and 28 make contact with and exchange heat from a heated product to cool down the product. Coolant circulates through the cooling holes 20 in the cooling steels so as to keep them at a low temperature. The contact areas are manufactured to have the same shape and dimensions with a completed product.

In particular, the hydraulic cylinders 60 and 80 are set to be from about 50 to 500 MPa suitable for freezing a shape and keeping cooling at the time of clamping.

Further, the cooling steel 21 has a plurality of tooling pins, the number and location of which corresponds to the number and locations of the holes formed in a product mounted on the cooling steel 21. Preferably, the tooling pins 212 have a circular cross-section and have a smaller size than the holes of the product by 0.1 to 1 mm. This is for ensuring that the tooling pins 212 are inserted into the holes even if the holes become smaller during a heating process.

Preferably, one of the plurality of holes formed on a product may have an exactly circular shape that corresponds to the shape of the tooling pins so as to be a reference for mounting the product on the cooling steel 21, and another of the plurality of holes may be an oval slot hole so as not to interfere or disturb the tooling pins 212 when the product is reduced in a rectangular shape during the cooling process.

Needless to say, this configuration may be equally applied to the rotation-type clamping cooling apparatus described with reference to FIGS. 5 to 9.

The operation of the clamping cooling apparatus will be described. Initially, a product is heated in a heating furnace at 900° C. or higher for three to six minutes, and, the product is mounted on the cooling steel 21 with the moving plate 83 located thereabove as shown in FIG. 10.

Then, if the hydraulic cylinders 60 and 80 operate, the moving plate 83 descends by the hydraulic, cylinder 80 along the guide pillars 81, such that the cooling steel 28 fixed under the moving plate 83 makes contact with the product.

In addition, the slider 45 is guided by the hydraulic cylinder 60 with the support of the slider support part 41, such that it slides until the cooling steel 24 at the front end makes contact with the product.

If the cooling steels 21, 24 and 28 make contact with the product, it is cooled down for 1 to 15 seconds.

After cooling is completed, the process is performed in the reverse order, and the product is pulled out.

The press-type clamping cooling apparatus has a simple structure with good durability.

As set forth above, according to exemplary embodiments of the present invention, laser trimming, hot stamping molding, and a hot stamping press can be eliminated so that cost can be saved and production speed can be increased. Further, a completed product is first produced by quick cold forming and then is heated, production speed is synchronized using a plurality of clamping cooling apparatuses, so that a mass production system can be established at lower cost with less facility space.

In particular by using a plurality of hydraulic clamping cooling apparatuses which is cheaper, productivity can be dramatically increased compared to existing hot forming methods.

Moreover, by using cold working to produce a product, it is possible to perform cooling in different directions, so that an ultra high tension product which is difficult to be produced using hot stamping can be manufactured.

Although the present invention has been described with reference to exemplary embodiments, it would be appreciated by those skilled in the art that the present invention is not limited thereto but various modifications and alterations might be made.

What is claimed is:

1. A clamping cooling apparatus, comprising:
a base of the clamping cooling apparatus used in clamp cooling;
a first cooling steel that is fixed on the base and has a heated product mounted thereon;
a plurality of second cooling steels that move relative to the base so as to make contact with a top of the product mounted on the first cooling steel; and
a moving device that moves the plurality of second cooling steels,
wherein the clamping cooling apparatus includes:
a third cooling steel that is installed on the base and makes contact with the product mounted on the first cooling steel approaching along a side surface of the product; and
a slider that has the third cooling steel at an of end of the slider, the slider being supported and slid by a slider support part fixed on the base, and the slider being slid by a hydraulic cylinder, and
wherein the moving device includes:
a rotation support part formed on the base; and
a rotation part that is coupled by a support hinge of the rotation support part,
wherein each of the plurality of second cooling steels is fixed on a side of the rotation part closer to a front end of the rotation part with respect to the support hinge, and a second hydraulic cylinder is hinged on another side with respect to the support hinge, wherein the rotation part rotates on the support hinge as the second hydraulic cylinder operates.

2. The clamping cooling apparatus according to claim 1, wherein the rotation support part has a support stopper formed thereon, and the rotation part has a rotation stopper installed thereon,
wherein the rotation stopper and the support stopper engage at a location where the rotation part rotates on the rotation support part so as to make contact with the product, such that the rotation part is supported.

3. A clamping cooling apparatus, comprising:
a base of the clamping cooling apparatus used in clamp cooling;
a first cooling steel that is fixed on the base and has a heated product mounted thereon;
a plurality of second cooling steels that move relative to the base so as to make contact with a top of the product mounted on the first cooling steel; and
a moving device that moves the plurality of second cooling steels,
wherein the clamping cooling apparatus includes:
a third cooling steel that is installed on the base and makes contact with the product mounted on the first cooling steel approaching along a side surface of the product; and
a slider that has the third cooling steel at an of end of the slider, the slider being supported and slid by a slider support part fixed on the base, and the slider being slid by a hydraulic cylinder and wherein the moving device includes: a rotation support part formed on the base; and a rotation part that is coupled by a support hinge of the rotation support part, wherein each of the plurality of second cooling steels is fixed on a side of the rotation part closer to a front end of the rotation part with respect to the support hinge, and a second hydraulic cylinder is hinged on another side with respect to the support hinge, wherein the rotation part rotates on the support hinge as the second hydraulic cylinder operates,
wherein the rotation support part has a support stopper formed thereon, and the rotation part has a rotation stopper installed thereon,
wherein the rotation stopper and the support stopper engage at a location where the rotation part rotates on the rotation support part so as to make contact with the product, such that the rotation part is supported.

\* \* \* \* \*